United States Patent [19]
Kopernicky
[11] Patent Number: 4,632,564
[45] Date of Patent: Dec. 30, 1986

[54] APPARATUS FOR REMOVING MOISTURE AND VOLATILES FROM MOLDING PARTICULATE PLASTIC MATERIAL FEED

[75] Inventor: Jaroslav J. Kopernicky, Bramalea, Canada
[73] Assignee: Mapro Inc., Georgetown, Canada

[21] Appl. No.: 731,982
[22] Filed: May 8, 1985

Related U.S. Application Data

[60] Division of Ser. No. 578,879, Feb. 10, 1984, Pat. No. 4,591,467, which is a continuation-in-part of Ser. No. 517,580, Jul. 27, 1983, abandoned.

[30] Foreign Application Priority Data

Jul. 22, 1983 [CA] Canada .................................. 433,017

[51] Int. Cl.[4] ........................... B29B 7/60; B29B 7/84
[52] U.S. Cl. ........................................ 366/75; 366/76; 425/203
[58] Field of Search .................. 425/203; 264/37, 102; 366/76, 139, 75; 159/2.2

[56] References Cited

U.S. PATENT DOCUMENTS 3,163,888 1/1965 Shattuck ......................... 425/550 X
3,913,796 10/1975 Aoki ................................ 425/203 X
3,940,220 2/1976 D'Arcangeli ................... 264/102 X

FOREIGN PATENT DOCUMENTS 1233133 5/1971 United Kingdom .................. 366/76

*Primary Examiner*—Jan Silbaugh
*Attorney, Agent, or Firm*—Riches, McKenzie & Herbert

[57] ABSTRACT

A method and apparatus for removing hot volatiles and moisture from particulate plastic material being fed for injection or extrusion molding by a plasticizing screw which rotates in a heated barrel. Flow control means, such as a conveying screw or rotary valve, drop the particulate material downward through a vertical feed passage extending to an opening in the barrel. At the same time, suction is applied to remove hot volatiles which are released through the opening in the barrel as the particulate plastic material is gradually melted as it is compressed by the screw. The rate of feed of the particulate material is restricted so that the barrel of the plasticizing screw is only partially filled near the opening, thereby improving the withdrawal of the gases from the barrel. The incoming particulate material is preheated by a continuous flow of hot air through it as it passes through a tubular guide member. The air flowing to the preheater passes through a heat exchanger where it recovers some waste heat from the hot gases withdrawn from the barrel to improve efficiency and reduce power costs.

7 Claims, 4 Drawing Figures

22
46
24
50
44
80
56
54
78
96
76
100
84
64
82
62
106
52
108
70
104
68
94
88
66
92
72
102
98
86
74
42
58
60
34
90
38
12
10
13

22
24
54
46
78
128
62
64
80
70
92
124
126
122
88
90
12
110
114
118
117
38
34
10

APPARATUS FOR REMOVING MOISTURE AND VOLATILES FROM MOLDING PARTICULATE PLASTIC MATERIAL FEED

This is a divisional of application Ser. No. 578,879, filed Feb. 10, 1984, now U.S. Pat. No. 4,591,467, which is a continuation-in-part of application Ser. No. 517,580, filed July 27, 1983, and now abandoned.

BACKGROUND OF THE INVENTION

This invention relates to plastic material and more particularly to the removal of moisture and volatiles from the plastic material.

In the injection and extrusion molding fields, particulate plastic material is normally fed to an elongated screw which is rotated in a heated barrel to plasticize the material to form melt. Well known and difficult problems in these fields are the removal of moisture from the particulate plastic material before entering the barrel and the removal of volatiles which are produced during plasticizing. While the type and volume of volatiles produced varies with the type of material and the particular application, this term is generally used herein to refer to the vaporized moisture, additives, binders, softeners, lubricants and other materials given off as a gas during plasticizing. As is well known, the volatiles often include monomers or other materials which are toxic or otherwise undesirable in the working environment. If sufficient moisture and volatiles are not removed, then the products molded from the melt frequently contain bubbles or other unacceptable imperfections.

In regard to the moisture problem, the particulate plastic material is often hygroscopic and it is normally shipped and stored in sealed containers. Nevertheless, it has remained necessary to dry the material prior to use to produce a satisfactory product. This is often done by heating the material in dryers for several hours using elaborate equipment. Various apparatus such as drying and vacuum ovens and desiccant filters have been designed for this purpose. One early type of continuous dryer for grain is shown in U.S. Pat. No. 759,527 which issued to Irwin May 10, 1904. However, drying has remained a requirement which is both costly and inconvenient due to the amount of electrical power necessary and the additional equipment required.

In regard to the volatiles problem, various provisions have been made to vent them from the barrel in which the screw rotates. However, this has the difficulty that the heat and the shearing forces produced by the screw that gradually melts the particulate plastic material and releases the volatiles causes problems with the vent. U.S. Pat. No. 3,655,313 to Kunogi which issued Apr. 11, 1972 discloses apparatus which controls the feed of particulate plastic material to the barrel. This structure has the disadvantage that it is difficult for the volatiles to escape. A later U.S. Pat. No. 3,826,477 to Kunogi et al. which issued July 30, 1974 discloses a relatively complicated combination of various barrel internal diameters and screw outer diameters to provide for a separate opening to which suction is applied. Both of these patents were assigned to Meiki Co., Ltd. which has a brochure entitled "M-Series Injection Molding Machine" No. C-320B 83. 8. 700 A which shows the use of a controlled feed with a separate vent opening. Providing a separate opening for the removal of the volatiles has the disadvantages that a longer more expensive screw is required and no heat is recovered from the hot volatiles passing through the incoming particulate plastic material.

More recently, as described in U.S. patent application Ser. No. 358,554 filed Mar. 16, 1982, the present inventor provides an earlier method and apparatus for the removal of the moisture and the volatiles without the necessity of pre-drying. This similarly involves applying suction to remove the volatiles through the opening in the barrel, and while this has worked very successfully for some applications, it has continuing problems for other applications. For instance, in some applications, the volatiles appear to have difficulty in flowing along the barrel to be removed through the opening. In large volume applications, plasticizing produces a considerable quantity of heat as well as moisture which tends to partially melt the particulate material in the area of the barrel opening causing it to bridge over and eventually restrict flow. In smaller applications, the mere presence of the suction tube in the opening can hinder flow of the particulate material. Furthermore, in injection molding applications, the normal process of the particulate material graudally melting as it is carried along the screw is disrupted when the screw is longitudinally actuated in the barrel to inject the melt. This causes the particulate material carried forward by the screw to be covered by the existing melt before the volatiles can be released. Another disadvantage of this previous device is that particles of plastic material are picked up by the hot gases and carried into the suction pipe at the material inlet. These airborne particles circulate in the interior of the preheater guide member and often stick together and to small particles from the incoming particulate material to form a cigar-shaped body which gradually builds up until it plugs the suction system.

In the present case, the inventor has found that a common opening in the barrel may be successfully used to both feed the particulate plastic material and remove hot volatiles by utilizing a combination of controlled feeding and the application of suction to remove the volatiles.

SUMMARY OF THE INVENTION

Accordingly, it is an object of the present invention to at least partially overcome the disadvantages of the prior art by providing for the improved feed of the particulate plastic material to the barrel opening and the recovery of waste heat from the hot volatiles to preheat the particulate plastic material. To this end, in one of its aspects, the invention provides apparatus for removing volatiles from plastic material being fed and plasticized for molding by an elongated plasticizing screw which rotates in a heated barrel, the barrel having a common opening through which the particulate plastic material is received and the volatiles are removed, comprising controlled supply means for feeding the particulate plastic material through said opening in the barrel, whereby the rate of feed is controlled to only partially fill the barrel with particulate material adjacent said opening, and suction means connected to apply sufficient suction to remove hot volatiles which are released through said opening in the barrel as the particulate plastic material gradually is melted by the heat and shearing forces as it is compressed by the screw.

In another of its aspect, the invention further provides a process for feeding particulate plastic material and removing volatiles through a common opening in a heated barrel in which a plasticizing screw rotates to feed plastic material for molding, comprising feeding particulate plastic material to said opening in the barrel at a rate controlled to only partially fill the barrel adjacent the inlet opening, and applying sufficient suction to remove hot volatiles which are released and escape through said opening in the barrel as the particulate plastic material is gradually melted by the heat and shearing forces as it is compressed by the screw as it is carried along the barrel away from said opening.

Further objects and advantages of the invention will appear from the following description taken together with the accompanying drawings.

Figure 1:
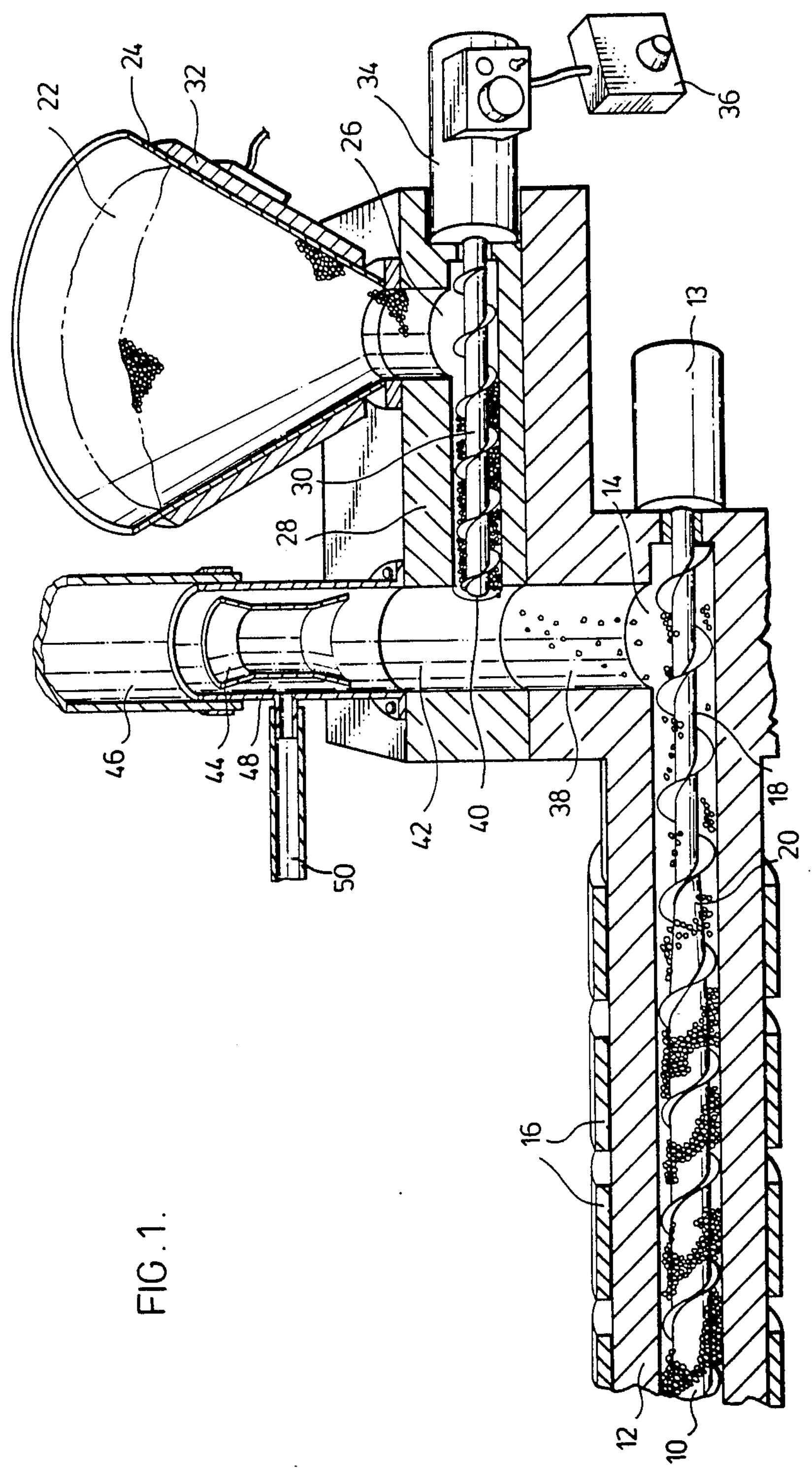
FIG. 1 is a partial sectional view showing apparatus according to a first embodiment of the invention.

Reference is first made to FIG. 1 which shows apparatus which plasticizes particulate plastic material into melt and feeds it for injection or extrusion molding. A conventional screw 10 is rotated in a barrel 12 by an electric or hydraulic motor 13 to carry the particulate plastic material received through an opening 14 in the barrel 12 towards a nozzle (not shown). The barrel 12 is heated by an electrical heating bands 16 and the screw has a conveying portion 18 adjacent the opening 14 and a plasticizing portion 20 where the size of the screw shaft gradually increases downstream from the conveying portion. Thus, as the particulate plastic material is carried (to the left in FIG. 1) away from the barrel opening it is compressed and the heat and shearing forces cause it to gradually melt layer by layer, releasing entrapped volatiles. This process is amplified and accelerated by the considerable quantities of heat generated by friction in the material as it is "worked" by the screw.

As may be seen, a supply of particulate plastic material 22 is provided by a hopper 24 which funnels the material through an inlet 26 in the barrel 28 of a separate conveying screw 30. The hopper 24 has an electrical heating strip 32 to preheat the particulate plastic material as described below. The screw 30 is rotated in the barrel 28 by a motor 34 and the speed of rotation is controlled by a motor speed control 36. The conveying screw 30 carries the particulate plastic material at a predetermined rate to a feed passage 38 extending vertically upward from the barrel inlet opening 14. The particulate material is fed into the feed passage 38 through an opening 40 and it falls downward through the opening 14 into the barrel 12 where it is carried away by the rotating screw 10. The feed passage 38 also has a suction opening 42 to which a suction or negative pressure is applied by a nozzle 44 in an exhaust duct 46. The nozzle 44 has an annular space 48 to which compressed air is applied through hose 50 to create a venturi which generates the suction. Alternately, the suction could, of course, be supplied by a fan. The exhaust duct 46 extends to atmosphere or to air cleaning equipment to avoid the volatiles which often contain toxic gases contaminating the workplace.

In use, particulate plastic material 22 from the hopper 24 is carried by the conveying screw 30 to the feed passage 38 where it is dropped into the barrel 12 through the opening 14. At the same time, the suction from the venturi nozzle 44 exhausts the hot volatiles released as the particulate plastic is gradually melted in the barrel 12. The speed of the motor 34 is controlled by the motor speed control 36 to restrict or control the rate at which the particulate material is fed into the barrel 12 so that it is only partially filled adjacent the opening 14. The molecular structure of the hygroscopic material allows moisture to be absorbed deep inside its particles. As the material moves along the barrel it is heated and "worked" by the action of the screw, particularly when it reaches the plasticizing portion 20. The heat, pressure and shearing forces melt the particles layer by layer gradually releasing the moisture and other volatiles as a vapour which flows out of opening 14. While this release must necessarily occur gradually as the particles are melted, increasing the application of heat accelerates it because expansion of the trapped moisture cracks or ruptures the surface of the particles and the moisture and other volatiles burst out. The application of the suction by the venturi nozzle 44 exhausts the hot volatiles to atmosphere. It is desirable that the release of these gases primarily occur over a relatively short length of travel along the screw 10 before the material itself interferes with the withdrawal of the gases from the barrel 12 and this early release can be assisted by preheating the material in the hopper 24. The considerable quantity of heat generated by the action of the screw also helps to sustain this process as the gases flow along the screw 10 and up through the feed passage 38. It will be appreciated that the controlled feed of the particulate material which leaves room in the barrel 12 for the flow of these gases near the opening 14 is critical to their successful removal.

Furthermore, if the application is injection molding, the screw 12 will normally gradually withdraw as it rotates and then periodically be actuated longitudinally forward to inject the melt according to a predetermined cycle. In this case, the feed of particulate material to the barrel 12 will be interrupted during injection by stopping rotation of the motor 34 using motor control circuit 36. This avoids a quantity of unmelted material being suddenly carried deep into the barrel 12 from where withdrawal of the hot volatiles is difficult if not impossible.

Figure 2:
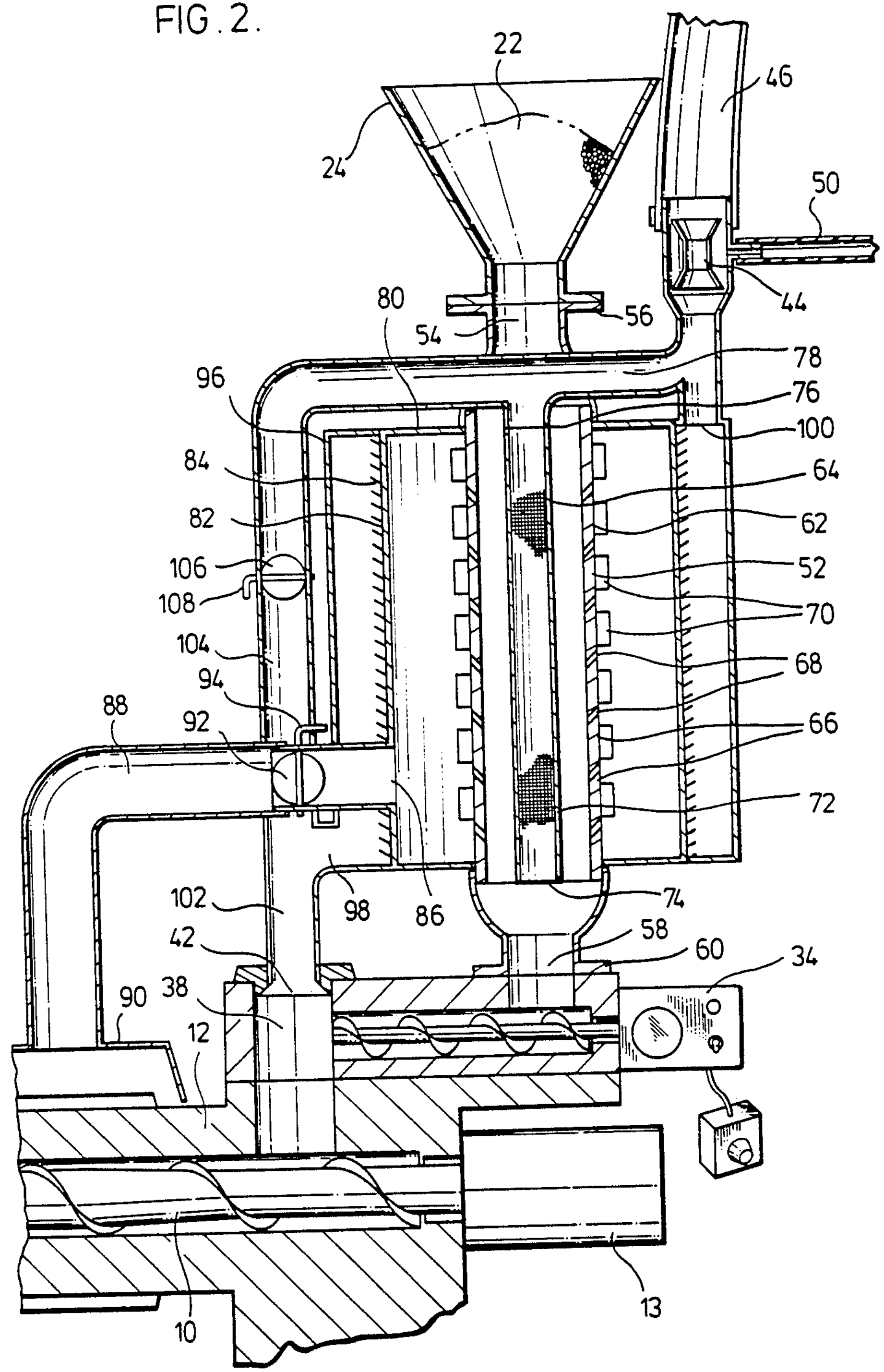
FIG. 2 is a similar view showing apparatus according to another embodiment of the invention.

Reference is now made to FIG. 2 which shows a modification of the above described embodiment. As many of the elements of this embodiment and the following embodiment are identical to those of the first embodiment, common elements are described and illustrated using the same reference numerals. In this embodiment, a tubular guide member 52 is mounted between the hopper 24 and the inlet 26 to preheat the particulate plastic material flowing into the barrel 28 of the conveying screw 30. The guide member 52 has an upper inlet 54 which is bolted to the hopper 24 at an abutment flange 56 and a lower outlet 58 bolted to the barrel 28 at another abutment flange 60. The guide member 52 has a rigid outer body 62 and a meshed inner body 64. The outer body 62 is formed of a number of steel rings 66 welded in a vertically spaced configuration to provide generally annular apertures 68 between them. The apertures 68 are angled upwardly at about 45° to provide for the passage of air, but not the escape of particulate material from the inside of the guide member 52. An electrical annular heating band 70 is secured to the outer surface of each of the rings 66 and they are connected to a temperature controller (not shown) to heat air drawn into the guide member 52 through the apertures 68. The hollow inner body 64 of the guide member is centrally located in and spaced from the outer body 62 and has a meshed cylindrical wall 72. The inner body has an open bottom 74 and an upper end 76 which is connected by a conduit 78 to the exhaust duct 46 containing the suction nozzle 44.

The outer body 62 of the guide member 52 is enclosed by a cylindrical housing 80 having an outer wall 82 formed of a conductive material such as sheet metal. In this embodiment, the walls 82 has numerous small fins 84 projecting outward from it to promote heat transfer. This inner housing 80 has an inlet 86 which is connected by conduit 88 to a heat gathering manifold 90 mounted over the heated barrel 12 to collect hot air given off by it. A conventional damper 92 is pivotally mounted in the inlet conduit 88 and has an external control handle 94 by which it may be rotated to regulate the flow of heated air to the inner housing 80.

The inner housing 80 is, in turn, enclosed by a cylindrical outer housing 96 to provide a heat exchanger. This outer heat exchanger housing 96 has an inlet 98 and an outlet 100 which is also connected to the exhaust duct 46 containing the suction nozzle 44. The inlet 98 is connected to a conduit 102 leading to the suction opening 42 to the feed passage 38. Thus, the hot volatiles from the barrel 12 are drawn through the heat exchanger housing 96 around the inner housing 80. For large applications where excessive quantities of hot gases are generated in the barrel 12 of the plasticizing screw 10, a bypass conduit 104 branches from conduit 102 and extends to conduit 78 to carry the hot gases from the feed passage suction opening 42 directly to the exhaust duct 46. The bypass conduit 104 also has a damper 106 pivotally mounted in it with an external control handle 108 to regulate the proportion of hot gases which pass through the heat exchanger housing 96.

Operation of this embodiment of the invention is similar to that described above. However, in this case, preheating as well as some limited pre-drying of the particulate plastic material is carried out as it flows through the guide member 52. As the particulate material flows from the hopper 24 down around the inner body 64 of the guide member 52, heated air from the apertures in the outer body 62 is drawn through it. The wall 72 of the inner body 64 is formed of a mesh which allows the incoming air to flow through it, but prevents the passage of the particulate material. The bottom 74 of the inner body 64 is left open because the particulate material will not flow upwardly into it and it does not extend down to interfere with the flow of particulate material into the inlet 26 to the barrel 28 of the conveying screw. Similarly, as is the case with the first embodiment, there is no constriction in the feed passage 38 to impede the flow of either the particulate material into the barrel 12 or the hot gases out of the barrel.

As mentioned above, the shearing action of the material as it is plasticized in the barrel 12 generates a considerable quantity of heat, most of which is withdrawn with the hot volatiles. In this embodiment of the invention, in order to improve efficiency and reduce electrical costs, these gases are drawn through the heat exchanger housing 96 where some of this waste heat is transferred to the incoming air in the inner housing 80. The incoming air collected by the manifold 90 is first heated by radiation from the hot barrel 12 and then by the heat transferred from the hot gases passing through the heat exchanger housing 96. Finally, if necessary, additional heat is provided by the heating bands 70 as the air flows through the apertures 68. While the amount of heat recovered from the hot gases varies with the volume and type of material being molded, normally the heating bands 70 need only be used during initial start-up. Preheating the particulate plastic material in the guide member 52 warms the particles through to their center and accelerates the process of removing the volatiles in the barrel 12. While the flow of hot air through it in the guide member does remove some surface moisture, the primary purpose is to preheat the material and it has been found that, for most plastics, preheating the material to temperatures in the range of 150°-200° F. will result in a product without defects due to entrapped gases. The dampers 92 and 106 in conduits 88 and 104 are adjusted in conjunction with the suction applied by the suction nozzle 44 to regulate the flow through them for each particular application. Sufficient hot air must be drawn through the guide member 52 to preheat the particulate material to the desired temperature, but it is undesirable to heat it too high. Therefore, if a large amount of heat is being generated during plastification, damper 106 may be opened to bypass some of it through conduit 104.

Figure 3:
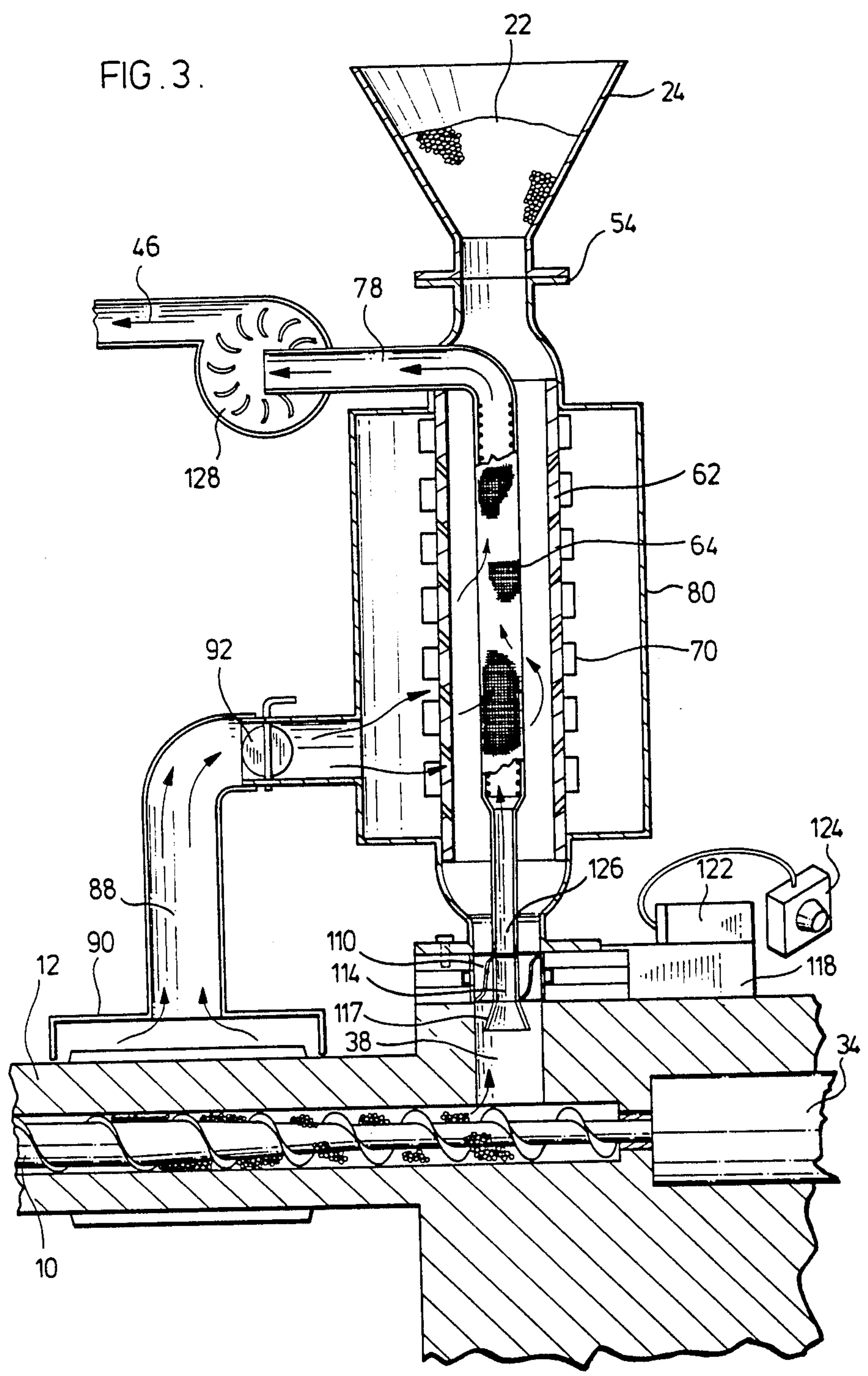
FIG. 3 is a partial sectional view illustrating apparatus according to a further embodiment of the invention.
Figure 4:
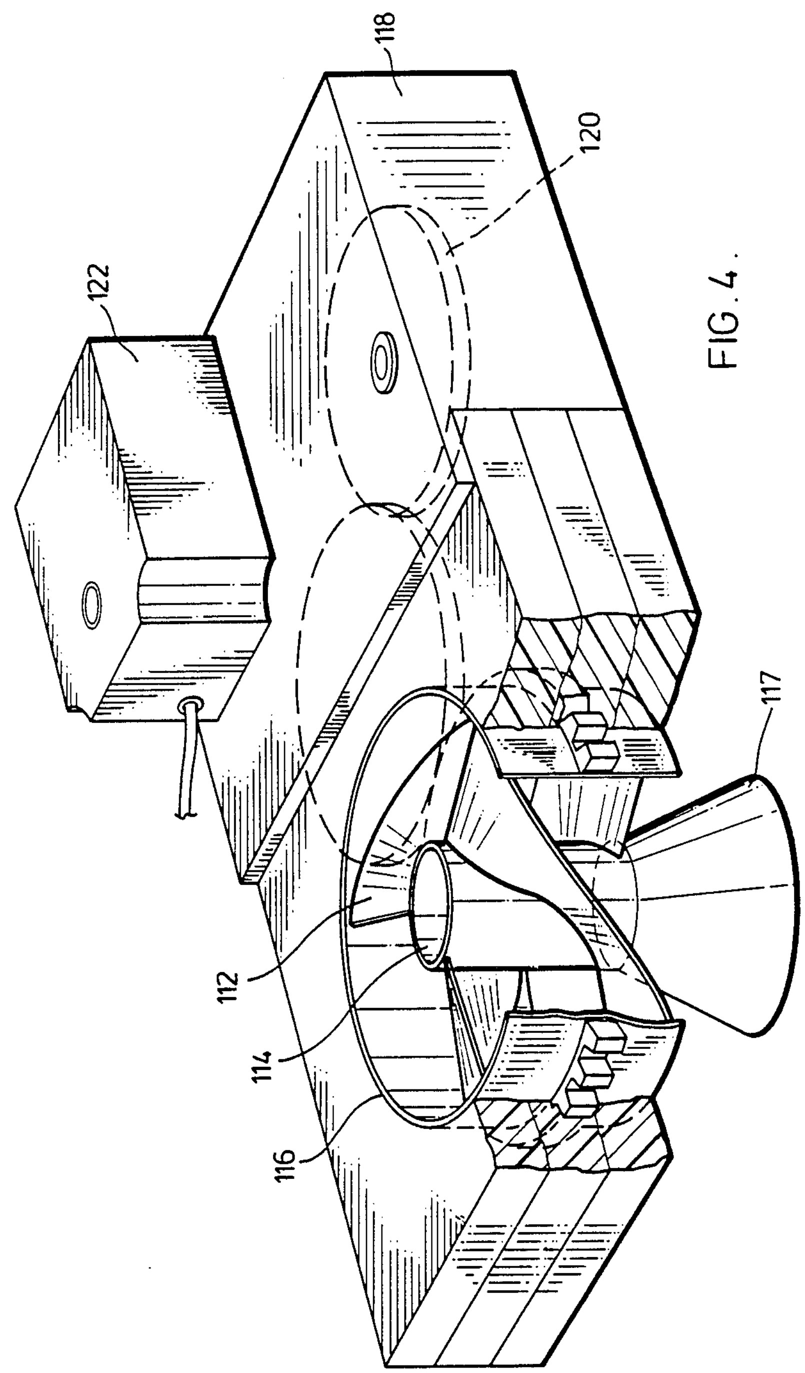
FIG. 4 is a cut-away isometric view of the rotary valve seen in FIG. 3.

Reference is now made to FIGS. 3 and 4 which illustrate another embodiment of the invention. In this embodiment, the incoming particulate plastic material is preheated in a guide member 52 as described above, but the means for controlling or regulating the flow of it is different. In this case, the conveying screw with the speed controlled motor have been replaced by a rotary valve arrangement 110 mounted in the top of the feed passage 38 leading to the barrel opening 14. The rotary valve 110 has three pitched blades 112 which rotate on a hollow central duct 114 in a collar 116 which is in alignment with the feed passage 38. The central duct 114 has a funnel-shaped mouth 117 and the blades 112 are mounted in valve block 118 to be rotated in a counterclockwise direction through gears 120 by an electric motor 122. Rotation of the blades 112 is controlled in a manner described below by a motor speed control 124. The bottom 74 of the guide member inner body 64 is connected to a pipe 126 which extends downwardly to the central duct 114. As may be seen, in this embodiment, the nozzle in exhaust duct 46 has been replaced by a centrifugal fan 128 to supply the suction.

In use, the particulate material from the hopper 24 is preheated as it flows down through the guide member 52. The blades 112 of the rotary valve 110 are shaped and pitched to block the downward flow of particulate material when they are not rotating. However, when they are rotated, they bite into the particulate material above them and scatter it at a controlled rate of feed down into the feed passage 38 below. As mentioned above, as the particulate plastic material is "worked" by the screw in the barrel, the heat, pressure and shearing forces gradually release the hot volatiles which are vented upwardly out of the barrel by feed passage 38 through the central duct 114 of the rotary valve 110. Suction from the fan 128 draws the hot volatiles into the inner body 64 of the guide member where they mix with air being drawn through the incoming particulate material and are exhausted through duct 46. In this case, the incoming air to the guide member is received through conduit 88 and additional heat is added as it flows through the apertures 68 by the heating bands 70. If the plasticizing screw 10 has an injection stroke, then rotation of the blades 112 is periodically stopped according to a predetermined cycle to interrupt the feed of particulate material during injection as described above in regard to the flow control means shown in FIGS. 1 and 2.

Although the description of this invention has been given with respect to particular embodiments, it is not to be construed in a limiting sense. Variations and modifications may now occur to those skilled in the art. For instance, other means of providing the suction may be used, and alternate particulate material flow control means may be used. The heating bands 70 around the rings 66 of the guide member 52 may be replaced by heating coils or rods or other suitable means. For a definition of the invention, reference is made to the appended claims

What I claim is:

1. Apparatus for removing volatiles from plastic material being fed and plasticized for molding by an elongated plasticizing screw which rotates in a heated barrel, the barrel having a common opening through which the particulate plastic material is received and the volatiles are removed, the screw having a plasticizing portion and a conveying portion, the conveying portion extending upstream from the plasticizing portion to said opening in the barrel, comprising:

(i) means for preheating the particulate plastic material to remove moisture as it is fed to said opening in the barrel, (ii) controlled supply means for feeding the particulate plastic material through said opening in the barrel, whereby the rate of feed is controlled to only partially fill the barrel with particulate material adjacent said opening, the controlled supply means comprising uncontrolled feed means connected to supply particulate plastic material to flow control means, the flow control means comprising a rotary valve means mounted in the feed passage below the feed means, the valve means having a plurality of pitched blades extending around a hollow central duct which leads upwardly to the suction means and controlled means for rotating the blades, whereby particulate plastic material flows downwardly between the blades when they are rotated in a horizontal plane at a controlled rate and the hot volatiles are removed upwardly through the hollow central duct, and (iii) suction means connected to apply sufficient suction to remove hot volatiles which are released through opening in the barrel as the particulate plastic material gradually is melted by the heat and shearing forces as it is compressed by the screw, whereby the interruption of flow of the particulate material into said barrel opening by bridging of the particulate material across said barrel opening is avoided.

2. Apparatus as claimed in claim 1 wherein the hollow central duct has a funnel-shaped downwardly open mouth to receive the vaporized moisture and hot volatiles.

3. Apparatus for removing volatiles from plastic material being fed and plasticized for molding by an elongated plasticizing screw which rotates in a heated barrel, the barrel having a common opening through which the particulate plastic material is received and the volatiles are removed, the screw having a plasticizing portion and a conveying portion, the conveying portion extending upstream from the plasticizing portion to said opening in the barrel, comprising:

(i) controlled supply means for feeding the particulate plastic material through said opening in the barrel, whereby the rate of feed is controlled to only partially fill the barrel with particulate material adjacent said opening, the controlled supply means comprising uncontrolled feed means connected to supply particulate plastic material to flow control means, (ii) suction means connected to apply sufficient suction to remove hot volatiles which are released through said opening in the barrel as the particulate plastic material gradually is melted by the heat and shearing forces as it is compressed by the screw, and (iii) particulate plastic material guide means connected between the feed means and the flow control means, the guide means having an upper inlet for receiving the particulate material and a lower outlet leading to the flow control means, the guide means including means for raising the temperature of the particulate plastic material as the particulate plastic material flows between the inlet and the outlet of the guide means, including temperature control means which permits selection of the temperature to which the particulate plastic material is heated, the guide means having an outer body extending between the upper inlet and the lower outlet, and a hollow inner body spaced from the outer body with an upper end connected to the suction means, the outer and inner body having walls with apertures therethrough which permit the flow of air but not the flow of particulate material therethrough, whereby the application of suction by the suction means to the inner body draws hot air through the apertures through the particulate material flowing through the guide means to preheat the particulate material to remove moisture, whereby the interruption of flow of the particulate material into said barrel opening by bridging of the particulate material across said barrel opening is avoided.

4. Apparatus as claimed in claim 3 further comprising:

a first housing surrounding the outer body of the guide means, heat gathering means located adjacent the heated barrel, and conduit means connecting the first housing and the heat gathering means whereby the suction means draws air heated by the hot barrel into the first housing and then through the apertures and the particulate plastic material.

5. Apparatus as claimed in claim 4 further including:

first damper means mounted in the conduit means connecting the first housing and the heat gathering means, and first damper control means, whereby the rate of flow of hot air into the first housing can be controlled.

6. Apparatus as claimed in claim 3 further comprising:

a first inner heat conductive housing surrounding the outer body of the guide means, the first housing having an inlet for receiving air which is drawn by the suction means through the apertures and the particulate material flowing through the guide means, and a second outer heat exchanger housing surrounding the first housing, the second housing having an outlet which is connected to the suction means and an inlet connected to draw the hot volatiles from said opening in the barrel around the inner housing, whereby heat from the hot volatiles is transferred to the air in the first inner housing which is then drawn through the particulate plastic material.

7. Apparatus as claimed in claim 6 further comprising:

second damper means with second damper control means adapted to control the rate of flow of hot volatiles to the heat exchanger housing.

* * * * *